(12) United States Patent
Lenzing et al.

(10) Patent No.: US 6,810,730 B2
(45) Date of Patent: Nov. 2, 2004

(54) DEVICE FOR MEASURING AIR FLOW, COMPRISING A DEVICE FOR SEPARATING FOREIGN PARTICLES

(75) Inventors: Thomas Lenzing, Benningen (DE); Uwe Konzelmann, Asperg (DE); Richard Joschko, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 84 days.

(21) Appl. No.: 10/182,507

(22) PCT Filed: Nov. 17, 2001

(86) PCT No.: PCT/DE01/04339
§ 371 (c)(1),
(2), (4) Date: Oct. 21, 2002

(87) PCT Pub. No.: WO02/44666
PCT Pub. Date: Jun. 6, 2002

(65) Prior Publication Data
US 2003/0089168 A1 May 15, 2003

(30) Foreign Application Priority Data
Nov. 30, 2000 (DE) .......................................... 100 59 421

(51) Int. Cl.[7] .................................................. G01F 1/68
(52) U.S. Cl. ..................................... 73/202.5; 73/204.22
(58) Field of Search ................................. 73/202, 202.5, 73/204.22

(56) References Cited

U.S. PATENT DOCUMENTS 6,332,356 B1 * 12/2001 Hecht et al. ................ 73/202.5
6,578,414 B2 * 6/2003 Kohmura et al. ............. 73/202

FOREIGN PATENT DOCUMENTS

| DE | 41 06 842 | 10/1991 |
| DE | 198 00 573 | 7/1999 |
| DE | 198 15 654 | 10/1999 |
| EP | 1 091 195 | 4/2001 |
| JP | 11 166720 | 6/1999 |

OTHER PUBLICATIONS

Patent Abstracts of Japan, vol. 1999, No. 11, Sep. 30, 1999.

* cited by examiner

Primary Examiner—Harshad Patel
(74) Attorney, Agent, or Firm—Kenyon & Kenyon

(57) ABSTRACT

A device including a bypass channel including a separating wall, which protects a measuring element, or, through a special arrangement of an inner wall surface, prevents foreign particles from flowing to the measuring element.

9 Claims, 2 Drawing Sheets

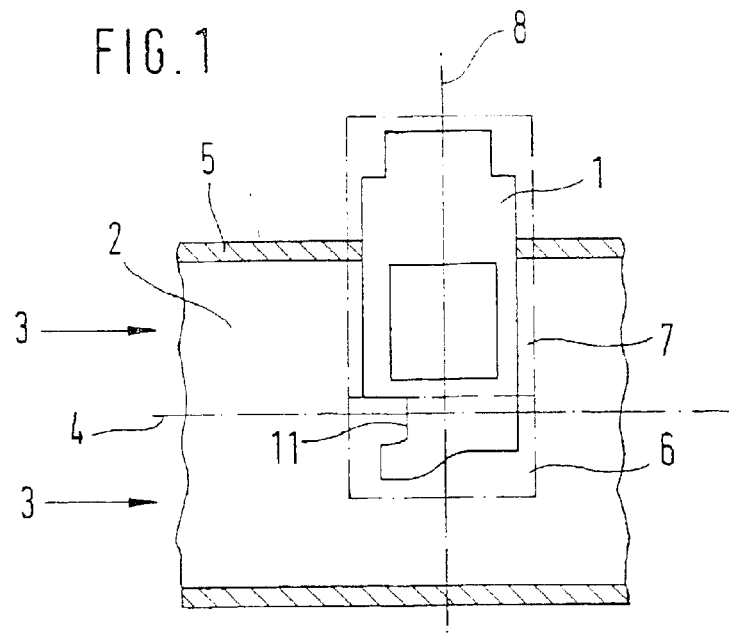
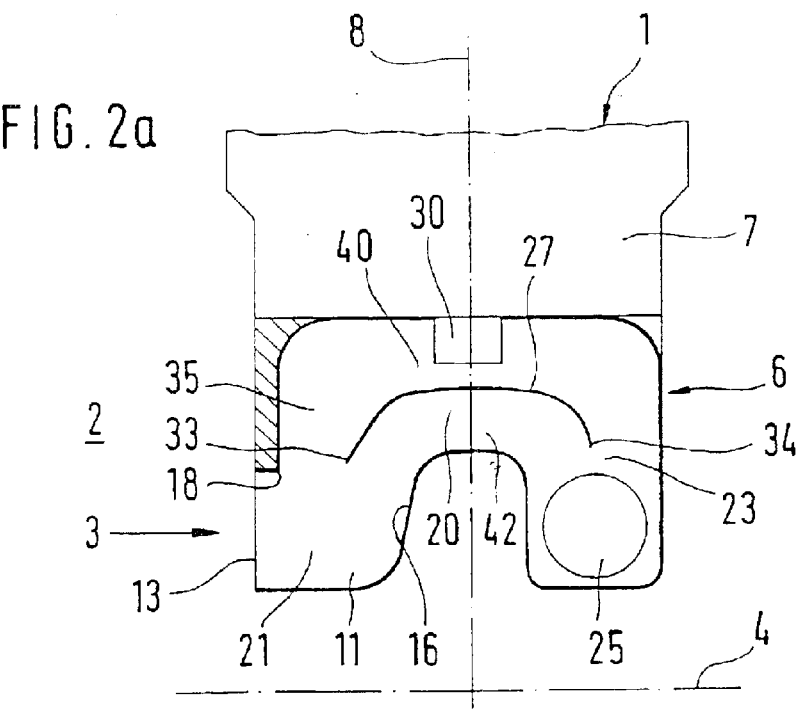

DEVICE FOR MEASURING AIR FLOW, COMPRISING A DEVICE FOR SEPARATING FOREIGN PARTICLES

FIELD OF THE INVENTION

The present invention relates to a device for determining at least one parameter of a flowing medium.

BACKGROUND INFORMATION

A hot-wire sensor for measuring gas volume flow, which is positioned in a bypass channel, in which there is a wall surface downstream from the opening of the bypass channel that runs parallel to the opening of the bypass channel, is described in German Published Patent Application No. 41 06 842. The sensor is not positioned in a shadowed region of the bypass channel, however, and is therefore not protected from soiling.

An air flow meter, which includes a separation point or a separating wall in the bypass channel, is described in European Patent Application No. 0 803 712. Furthermore, there is a wall in the bypass channel that is parallel to the inlet opening of the bypass channel and also completely covers this opening. The sensor is not protected from liquids flowing in, however.

A measuring device for measuring the mass of a medium flowing in the line is described in German Published Patent Application No. 198 15 654, in which there is a separation point or separating wall in the bypass channel that is intended to protect the measuring element from solid particles and other impurities. However, due to the reflections of the solid particles that hit an inner wall in the bypass channel, these are reflected into the measuring channel and may hit the measuring element there.

There is no indication that one may, on the basis of the law of reflection, influence the reflections of solid particles by changing the inner wall.

A bypass geometry is described in a publication, in which there is a separating wall in the bypass channel that extends parallel in the flow direction, and there is a wall surface that runs parallel to the inlet opening of the bypass channel The wall surface lies downstream of the measuring element.

Here, the measuring element is protected from the main flow by the separating wall and a lower inlet opening.

The varying course of the main channel and the measuring channel results in increased signal noise. In case of backflow, liquids, particles, and oil may directly reach the measuring channel and may soil or destroy the measuring element.

SUMMARY OF THE INVENTION

The device according to the present invention may provide the advantage that the at least one measuring element is protected from the impingement of liquids and particles in a simple manner.

It may be advantageous if the inlet opening of the bypass channel includes a rough edge for liquids, because in this manner, a liquid wall film, which may possibly reach the measuring element, may no longer form in the bypass channel in the region of the inlet opening.

The outlet opening of the bypass channel may advantageously be oriented laterally, downward, or in the flow direction.

The separating wall may advantageously include at least one U-shaped section, in order to protect the sensor in this manner during forward flows as well as backflows.

Example embodiments of the present invention are illustrated in simplified form in the drawings and explained in greater detail in the following description.

BRIEF DESCRIPTION OF THE DRAWINGS

FIG. 1 shows a device for determining at least one parameter of a flowing medium in the installed state.

FIG. 2a shows a bypass channel in a measuring housing of the device according to the present invention.

DETAILED DESCRIPTION

Figure 2B:
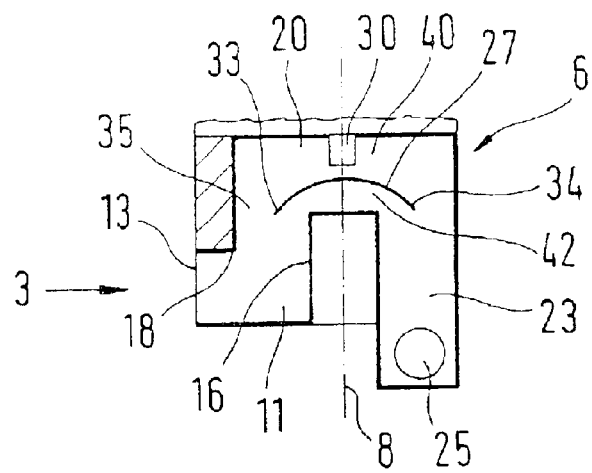
FIG. 2b shows a bypass channel in a measuring housing of the device according to the present invention.

FIG. 1 schematically shows how a device 1 is installed in a line 2, in which the medium to be measured flows. Device 1 for determining at least one parameter includes a measuring housing 6, identified by a lower rectangle indicated by a dot-dash line, and a carrier part 7, identified by an upper rectangle indicated by a dot-dash line, in which, for example, analyzing electronics are housed. In this example embodiment of device 1, a measuring element 30 (FIG. 2) is used, which, for example, determines the volume rate of flow of the flowing medium. Further parameters which may be measured are, for example, the pressure, the temperature, a concentration of a medium component, or a flow rate, which may be determined using suitable sensors.

Measuring housing 6 and carrier part 7 have, for example, a common longitudinal axis 8, which runs in the direction of installation and may, for example, also be the center axis. Device 1 is, for example, pluggably inserted into a wall 5 of line 2. Wall 5 delimits a flow cross-section of line 2, in whose center a center axis 4 extends in the direction of the flowing medium parallel to wall 5. The direction of the flowing medium, referred to in the following as the main flow direction, is identified by corresponding arrows 3 and runs from left to right in this case.

FIG. 2a shows measuring housing 6 including bypass channel 11. Bypass channel 11 includes an inlet opening 13, through which the medium flows into bypass channel 11. Downstream of inlet opening 13 and upstream of measuring element 30 is an inner wall surface 16, which runs roughly parallel to inlet opening 13 and against which particles entering in main flow direction 3, such as solid particles and liquid particles, strike frontally, i.e., perpendicularly. A projection of inlet opening 13 is shown in full on inner wall surface 16. Inlet opening 13 is delimited at the top by a rough edge 18, so that no liquid wall film that may reach measuring element 30 forms there on the bypass channel wall.

After inlet opening 13, inlet channel 21 begins as a section of bypass channel 11. Thereafter, bypass channel 11, for example, makes an approximately 90 degree bend in the direction of carrier part 7, then runs in a middle section 20 roughly parallel to flow direction 3 and then, for example, sharply bends by 90 degrees downward, i.e., away from carrier part 7, to form an outlet channel 23, in order to leave measuring housing 6 again through an outlet opening 25. Bypass channel 11 therefore includes, for example, at least one section in a U-shape.

Outlet opening 25 may be on the side of measuring housing 6, or it may be configured such that the medium leaves bypass channel 11 again downward in flow direction 3 or perpendicular to flow direction 3.

Measuring element 30 is positioned in middle section 20. Measuring element 30 partly projects into carrier part 7. Below measuring element 30 and carrier part 7 is a separating wall 27 running in middle section 20 perpendicular to the plane of the drawing, the separating wall having a U-shape, for example, that is adapted to the course of bypass channel 11. Separating wall 27 begins upstream at a separation point 33, which lies in a shadowed region 35. Shadowed region 35 is the section of bypass channel 11 that is not covered by a projection of inlet opening 13 that is perpendicular to flow direction 3, i.e., particles entering bypass channel 11 parallel to flow direction 3 are first redirected in order to reach shadowed region 35. Separating wall 27, which completely or almost completely extends from one side of the wall of bypass channel 11 to the other, divides bypass channel 11 into two channels, a measuring channel 40 including measuring element 30, and a bypass channel 42 situated geodetically below the measuring channel. Measuring channel 40 includes, for example, sections of inlet channel 21 and outlet channel 23.

Measuring channel 40 and bypass channel 42 reunite downstream of measuring element 30. This may also occur directly upstream of outlet opening 25.

An axial arrangement of inner wall surface 16 lies in flow direction 3 among separation point 33, the start of separating wall 27 upstream, and an end 34 of separating wall 27 downstream.

If the flowing medium in line 2 contains liquid particles and these flow into bypass channel 11, a liquid wall film that may reach in the direction of measuring element 30 may not form due to rough edge 18. Downstream of inlet opening 13, the liquid particles hit inner wall surface 16 and form a wall film there that moves through bypass channel 42 in the direction of outlet opening 25.

Solid particles, due to their inertia, also do not reach measuring channel 40. Solid particles such as, for example, dust particles, frontally, i.e., perpendicularly, hit inner wall surface 16 and are reflected back there and leave bypass channel 11 again through inlet opening 13 or are swept away by the flow into bypass channel 42. Bypass channel 42 is configured in such a manner and is so wide that there is no capillary effect even with a large quantity of liquid entering.

The advantage arising from the effects described may be that, downstream of inlet opening 13, a part of the medium that is free of liquid droplets and solid particles is deflected in an upward direction toward carrier part 7 and flows through measuring channel 40 and measuring element 30, while, through the separation by manner of separating wall 27, the part of the medium burdened with liquid and solid particles is guided past it through bypass channel 42 underneath.

FIG. 2b shows another configuration alternative of bypass channel 11, which corresponds to a U-shape roughly in the region of middle section 20. Outlet opening 25, in comparison to FIG. 2a, lies underneath inlet opening 13, i.e., the distance of outlet opening 25 in the direction of center axis 4 to measuring element 30 is greater than that of inlet opening 13.

Outlet opening 25 may also open downward, i.e., the flowing medium leaves bypass channel 11 perpendicular to flow direction 3. Separating wall 27 extends, for example, only in measuring channel 40 and is U-shaped.

Figure 2C:
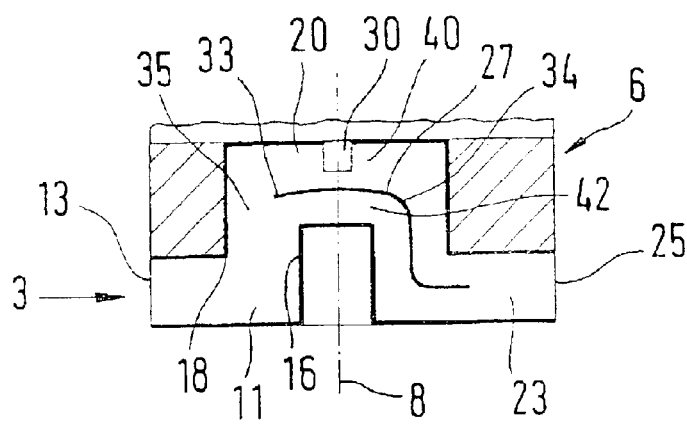
FIG. 2c shows a bypass channel in a measuring housing of the device according to the present invention.

In FIG. 2c, in contrast with FIG. 2a, outlet opening 25 is positioned parallel to inlet opening 13, i.e., the flowing medium leaves bypass channel 11 in flow direction 3.

Separating wall 27 extends in measuring channel 40 up to outlet channel 23 and is, for example, S-shaped.

Figure 2D:
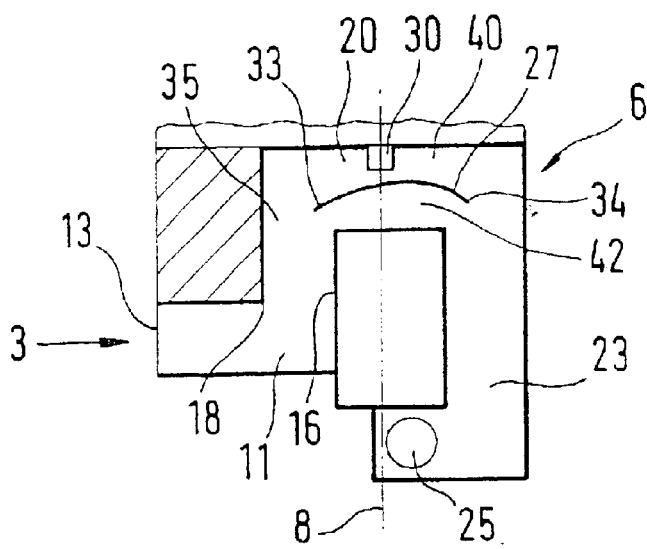
FIG. 2d shows a bypass channel in a measuring housing of the device according to the present invention.

In FIG. 2d, outlet channel 23, starting from the end of outlet channel 23 of FIG. 2b, again sharply bends against flow direction 3, for example by 90°, such that, forming another U-shape, it runs at least partially against flow direction 3. Outlet opening 25 may be configured such that the flowing medium leaves bypass channel 11 perpendicularly (FIG. 2d) or against flow direction 3.

The configuration alternatives of bypass channel 11 are selected according to the demands on device 1 such as, for example, pulsation characteristics, backflows, etc.

What is claimed is:

1. A device for determining at least one parameter of a medium flowing in a line, comprising:

at least one measuring element around which the medium flows;

a first bypass channel extending along a flow direction between an inlet opening connected to the line and at least one outlet opening leading into the line downstream from the inlet opening;

a separating wall;

at least one separation point arranged in the first bypass channel between the inlet opening and the at least one measuring element, the at least one separation point dividing the first bypass channel into a measuring channel in which the at least one measuring element is arranged and a second bypass channel that bypasses the at least one measuring element in the flow direction, the at least one separation point laying outside of a projection of the inlet opening in the flow direction and being formed by the separating wall; and an inner wall surface arranged downstream from the inlet opening in the first bypass channel, the inner wall surface extending parallel to the inlet opening and completely covering the projection of the inlet opening in the flow direction;

wherein the inner wall surface is arranged between the at least one separation point, an upstream beginning of the separating wall, and a downstream end of the separating wall.

2. The device according to claim 1, wherein:

the at least one parameter is a mass-flow rate of intake air of an internal combustion engine.

3. The device according to claim 1, wherein:

the separating wall is u-shaped.

4. The device according to claim 3, wherein:

the separating wall defines the second bypass channel in which the medium containing liquids and solid particles flows, and no capillary effect occurs in the second bypass channel.

5. The device according to claim 1, wherein:

the separating wall is adapted to a course of the first bypass channel.

6. The device according to claim 5, wherein:

the separating wall defines the second bypass channel in which the medium containing liquids and solid particles flows, and no capillary effect occurs in the second bypass channel.

7. The device according to claim 1, wherein:

the inlet opening includes a separating edge.

8. The device according to claim 1, wherein:

the first bypass channel includes at least one u-shaped section.

9. The device according to claim 1, further comprising:

a measuring housing extending along a longitudinal axis;

wherein the first bypass channel is arranged in the measuring housing; and wherein the at least one outlet opening of the first bypass channel is directed transversal to a main flow direction of the medium and transversal to the longitudinal axis of the measuring housing.

* * * * *